(12) United States Patent
Ku et al.

(10) Patent No.: US 8,610,523 B2
(45) Date of Patent: Dec. 17, 2013

(54) MAGNETIC FIX STRUCTURE APPLYING ON A PROJECTION DEVICE

(75) Inventors: Tsang-Hsing Ku, Taoyuan Hsien (TW); Kuang-Hsiao Liu, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 13/349,077

(22) Filed: Jan. 12, 2012

(65) Prior Publication Data

US 2012/0188034 A1    Jul. 26, 2012

(30) Foreign Application Priority Data

Jan. 21, 2011    (TW) .............................. 100102225 A

(51) Int. Cl.
  *H01F 1/00*    (2006.01)
  *H01F 7/20*    (2006.01)

(52) U.S. Cl.
  USPC .......................................... 335/219; 335/285

(58) Field of Classification Search
  USPC .......................................... 335/285, 306, 219
  See application file for complete search history.

(56) References Cited

U.S. PATENT DOCUMENTS

| | | | | |
|---|---|---|---|---|
| 3,598,900 | A * | 8/1971 | Drake | 174/138 F |
| 4,489,366 | A | 12/1984 | Rozniecki | |
| 5,676,441 | A | 10/1997 | Takahashi | |
| 6,515,761 | B2 * | 2/2003 | Aoto et al. | 358/1.6 |
| 6,870,732 | B2 * | 3/2005 | Huang et al. | 361/679.17 |
| 7,174,647 | B2 | 2/2007 | Krantz et al. | |
| 7,541,907 | B2 * | 6/2009 | Wang et al. | 335/305 |
| 7,632,114 | B2 * | 12/2009 | Danner | 439/131 |
| 7,847,514 | B2 * | 12/2010 | Idzik et al. | 320/103 |
| 8,050,714 | B2 * | 11/2011 | Fadell et al. | 455/557 |
| 8,078,224 | B2 * | 12/2011 | Fadell et al. | 455/557 |
| 8,138,868 | B2 * | 3/2012 | Arnold | 335/219 |
| 8,155,713 | B2 | 4/2012 | Sip et al. | |
| 8,187,006 | B2 * | 5/2012 | Rudisill et al. | 439/39 |
| 2002/0089678 | A1 * | 7/2002 | Aoto et al. | 358/1.6 |
| 2005/0028417 | A1 * | 2/2005 | Kim | 40/711 |
| 2006/0237604 | A1 | 10/2006 | Tan | |
| 2007/0103266 | A1 * | 5/2007 | Wang et al. | 335/285 |
| 2008/0123285 | A1 * | 5/2008 | Fadell et al. | 361/686 |
| 2008/0146295 | A1 * | 6/2008 | Jorgensen et al. | 455/575.3 |

(Continued)

FOREIGN PATENT DOCUMENTS

| | | |
|---|---|---|
| CN | 1166619 A | 12/1997 |
| CN | 1761819 A | 4/2006 |

(Continued)

OTHER PUBLICATIONS

Chinese Office Action for Application No. 201110050454.6; Date of Mailing: Oct. 9, 2013, with English Translation.

(Continued)

*Primary Examiner* — Alexander Talpalatski
(74) *Attorney, Agent, or Firm* — Cantor Colburn LLP

(57) ABSTRACT

The invention is a magnetic fix structure that applies on a projection device. The magnetic fix structure includes a first magnetic connector set and a second magnetic connector set, and the projection device includes a projection module housing and a power module housing. The first magnetic connector set and the second magnetic connector set are disposed on the projection module housing and the power module housing respectively. Therefore, through the attraction between the first magnetic connector set and the second magnetic connector set, the power module housing can be fixed onto the projection module housing.

16 Claims, 10 Drawing Sheets

(56) References Cited

U.S. PATENT DOCUMENTS

| | | | |
|---|---|---|---|
| 2008/0150662 A1* | 6/2008 | Broumand .................... 335/285 |
| 2008/0219488 A1* | 9/2008 | Crooijmans et al. .......... 381/333 |
| 2009/0212637 A1* | 8/2009 | Baarman et al. .............. 307/104 |
| 2009/0251113 A1* | 10/2009 | Raghuprasad ................... 322/39 |
| 2010/0146308 A1* | 6/2010 | Gioscia et al. ................ 713/300 |
| 2010/0222110 A1 | 9/2010 | Kim et al. |
| 2010/0227642 A1* | 9/2010 | Kim et al. .................. 455/556.1 |
| 2011/0192857 A1* | 8/2011 | Rothbaum et al. ............ 220/694 |
| 2013/0173035 A1 | 7/2013 | Fadell et al. |

FOREIGN PATENT DOCUMENTS

| | | |
|---|---|---|
| CN | 101320987 A | 12/2008 |
| CN | 101556486 A | 10/2009 |
| CN | 101628562 A | 1/2010 |
| CN | 101753647 A | 6/2010 |
| CN | 201569844 U | 9/2010 |
| CN | 201594167 U | 9/2010 |
| JP | 2007328002 A | 12/2007 |
| TW | 587794 | 5/2004 |
| TW | M349166 U | 1/2009 |
| TW | 200924601 A | 6/2009 |
| TW | 200715630 | 6/2010 |

OTHER PUBLICATIONS

TW Office Action for Application No. 100102225; Date of Mailing: Aug. 22, 2013; 5 pgs. with English Translation.

* cited by examiner

MAGNETIC FIX STRUCTURE APPLYING ON A PROJECTION DEVICE

This application claims priority to Taiwan Patent Application No. 100102225 filed on Jan. 21, 2011.

CROSS-REFERENCES TO RELATED APPLICATIONS

Not applicable.

BACKGROUND OF THE INVENTION

1. Field of the Invention

The present invention relates to a magnetic fix structure applying to a projection device, and more particularly, to a magnetic fix structure that uses magnetic units to join housings or elements of a projection device together.

2. Descriptions of the Related Art

With the widespread utilization of projection devices, the demand for an easy to assemble and disassemble has been gradually increasing. To accomplish a more rapid assembling process and reduce the number of defective products caused by failure during the assembling process, projection devices must be designed with a foolproof arrangement that can be easily aligned among the components. FIG. 1 illustrates a conventional projection device 10, which comprises a bottom surface 101, a battery 12 and a plurality of screws 14. Usually during the assembling, the top surface 121 of the battery 12 is aligned with the bottom surface 101 of the projection device 10. Therefore, an electrical structure disposed on the top surface 121 of the battery 12 is electrically connected to an electrical structure disposed on the bottom surface 101 of the projection device 10. Then, the battery 12 is screwed onto the projection device 10 by using the screws 14.

This kind of conventional projection device has two disadvantages. The first disadvantage is that the alignment of the battery 12 has to be considered in the assembling process. Furthermore with reference to FIG. 1, if the positions of the screw holes are not designed to be asymmetric or there is no additional aligning device, then it is often the case that the bottom surface 122 of the battery 12 is mistakenly attached to the bottom surface 101 of the projection device 10 during the assembly. In other words, the projection device 10 and the battery 12 cannot be electrically connected to each other. The second disadvantage is that after alignment, even a slight error in the screwing process will affect the precision of other screwing processes and the accuracy of the electrical connection of the battery.

In view of the above said disadvantages, to effectively reduce errors and increase speed during assembly, a method in which the power supply and body of the projection device are joined together by magnetic units is provided. Also, this reduces the structural complexity and improves production efficiency; and additionally, by using the magnetic units in conjunction, the magnetic poles of the magnetic units may be appropriately oriented, making it foolproof and aligned during assembly.

SUMMARY OF THE INVENTION

An objective of the present invention is to provide a magnetic fix structure for a projection device, to make the projection device easy to construct and simple. The projection device is connected by snap-fitting or from the attraction between the magnetic units; either of these method further facilitate the alignment during assembly.

To achieve the aforesaid objective, a magnetic fix structure that applies on a projection device is provided. The projection device comprises a projection module housing and a power module housing. The magnetic fix structure comprises a first magnetic connector set and a second magnetic connector set. The first magnetic connector set is disposed on an inner bottom surface of the projection module housing, and the first magnetic connector set comprises a plurality of magnetic units. On the other hand, the second magnetic connector set is disposed on an inner top surface of the power module housing, while the second magnetic connector set comprises the exact number of magnetic units as the first magnetic connector set. Each of the magnetic units of the first magnetic connector set is disposed correspondingly to one of the magnetic units of the second magnetic connector set respectively. In other words, an end of each of the magnetic units of the first magnetic connector set attracts an end of one of the magnetic units of the second magnetic connector set. Each end of the attracted magnetic units comprises an opposite magnetic pole. For example, if the end of any of the magnetic units of the first magnetic connector set is an N pole, then the end of the corresponding magnetic units of the second magnetic connector set would be an S pole, and vice versa.

In the present invention, the magnetic poles, the amounts and the positions of the magnetic units may all be optionally adjusted depending on the way in which the projection module housing and the power module housing are constructed and aligned with each other.

Thereby, the projection module housing and the power module housing of the projection device can be easily assembled and disassembled, and prevent the loss of elements and materials caused by errors during installation.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a magnetic fix structure that applies to a projection device. In the present invention, the magnetic fix structure comprises a first magnetic connector set 2 and a second magnetic connector set 3. The projection device comprises a projection module housing 4 and a power module housing 5.

Figure 1:
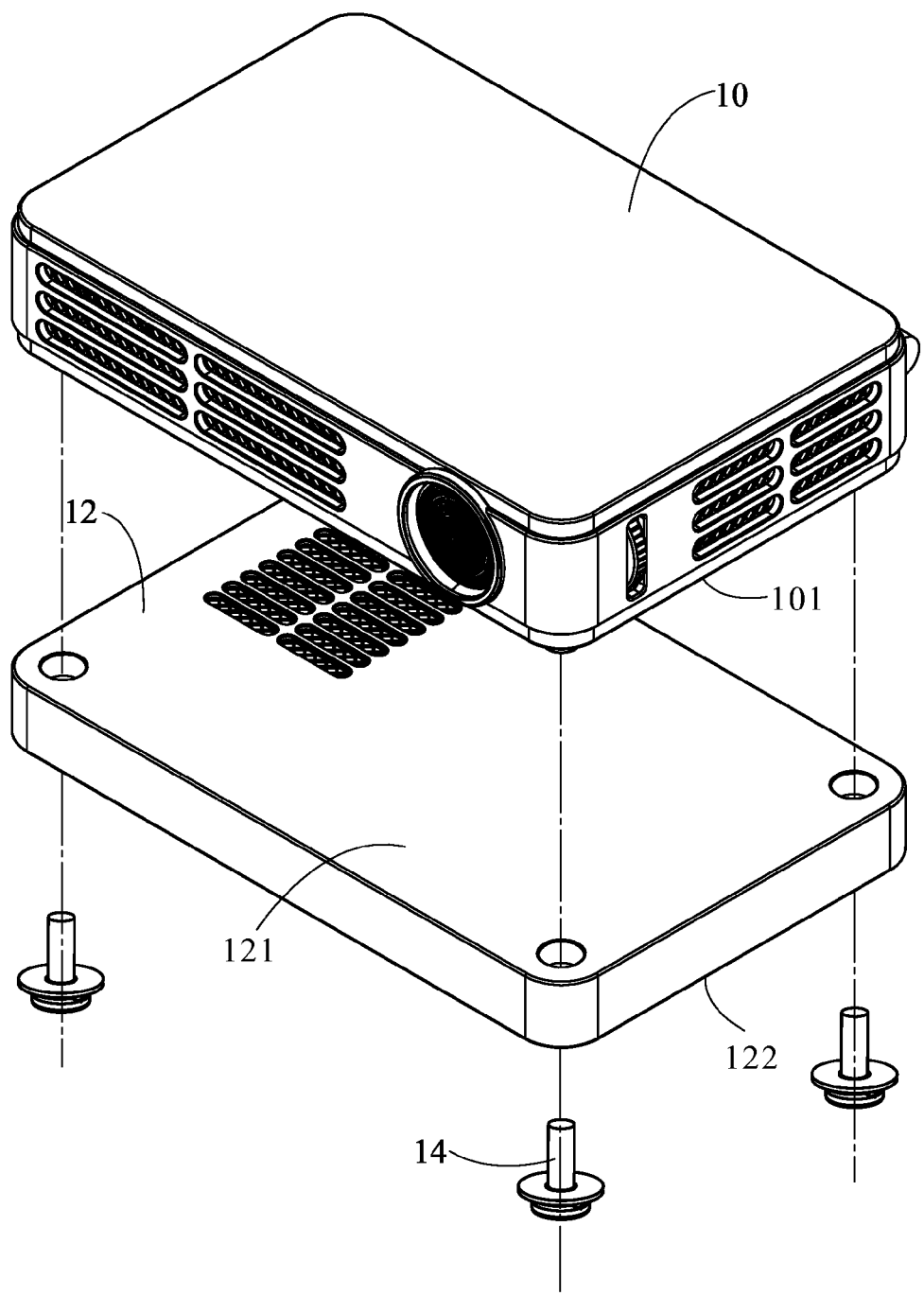
FIG. 1 is a schematic view of a conventional projection device.
Figure 2:
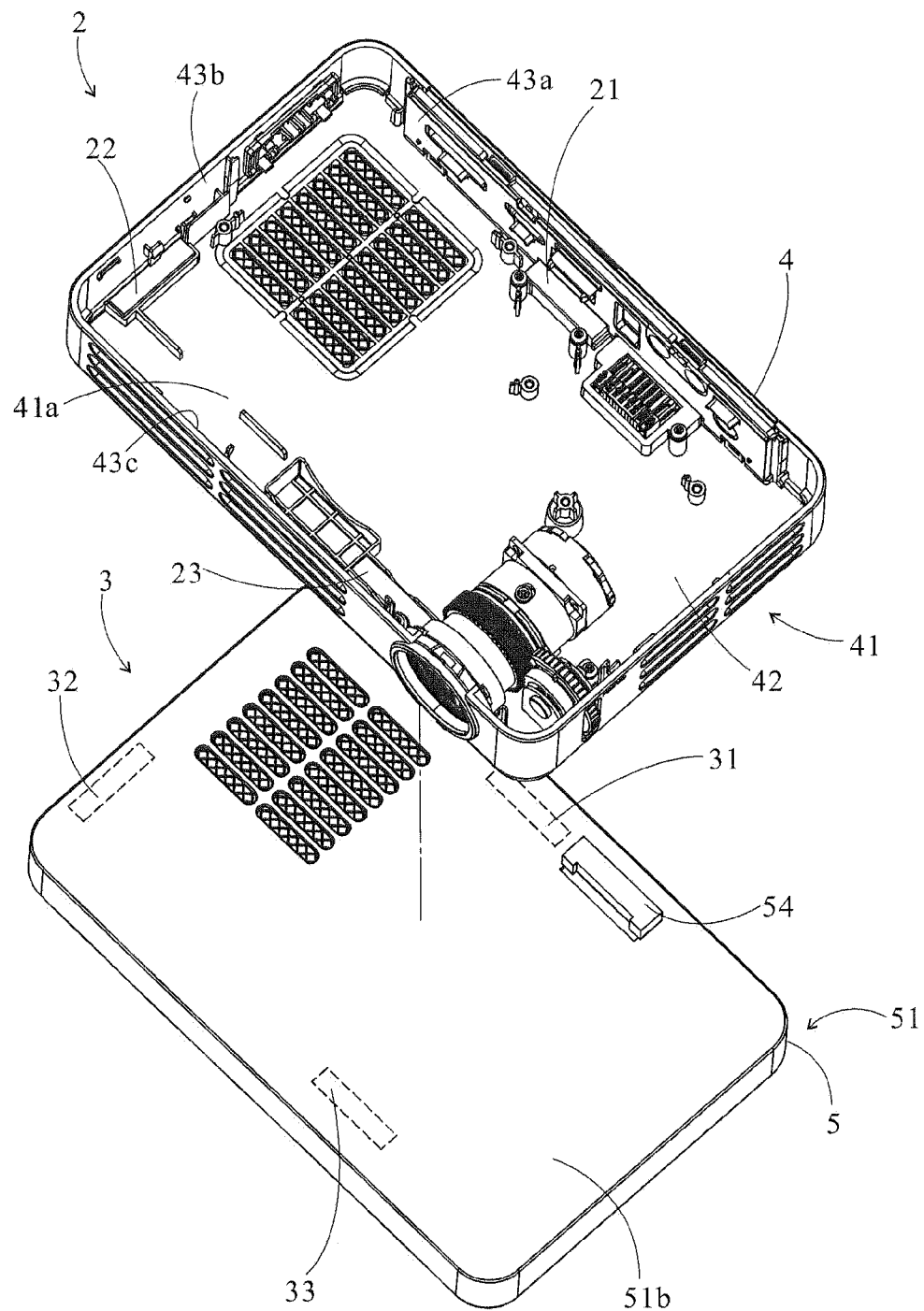
FIG. 2 is a schematic top view of a magnetic fix structure according to a first preferred embodiment of the present invention during assembly with a projection device.
Figure 3:
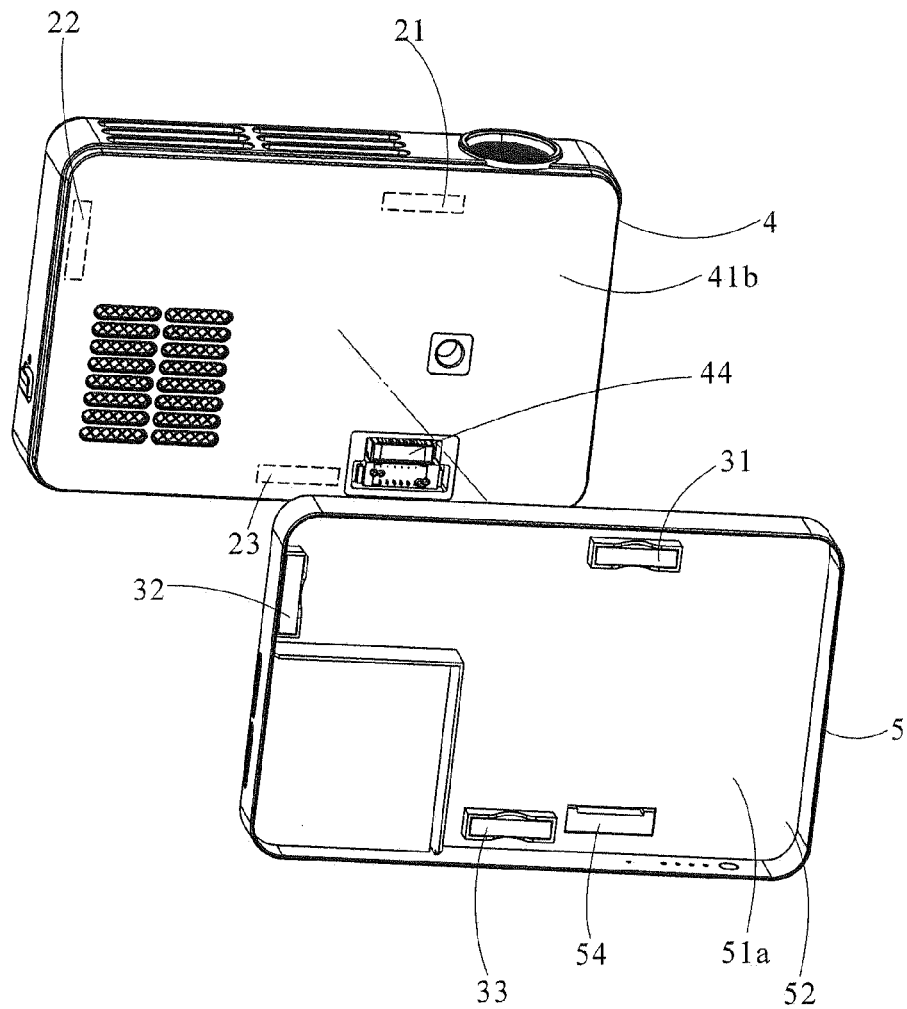
FIG. 3 is a schematic bottom view of the magnetic fix structure according to the first preferred embodiment of the present invention during assembly with a projection device.
Figure 4A:
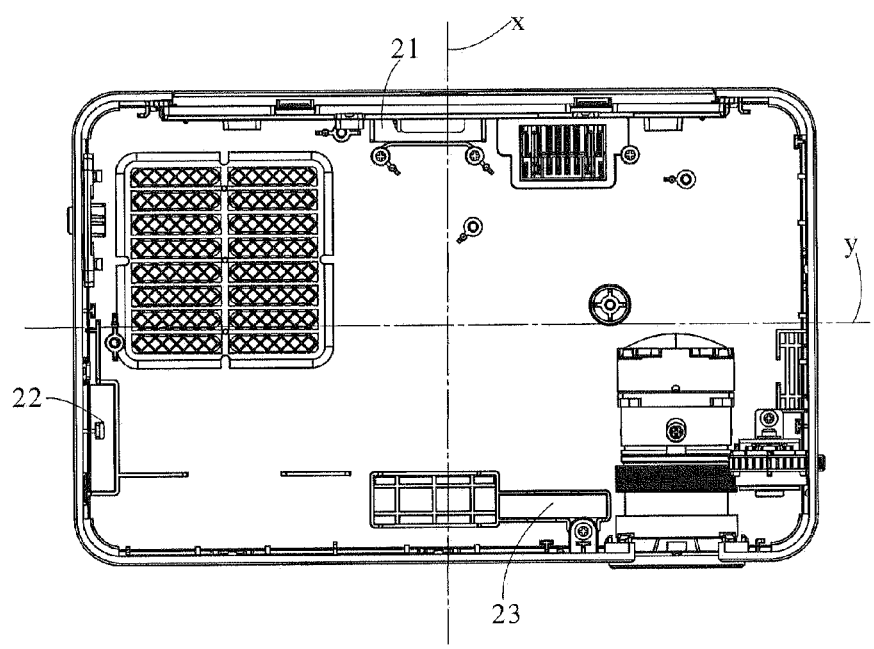
FIG. 4A is a top view of a projection module housing of the magnetic fix structure according to the first preferred embodiment of the present invention.
Figure 4B:
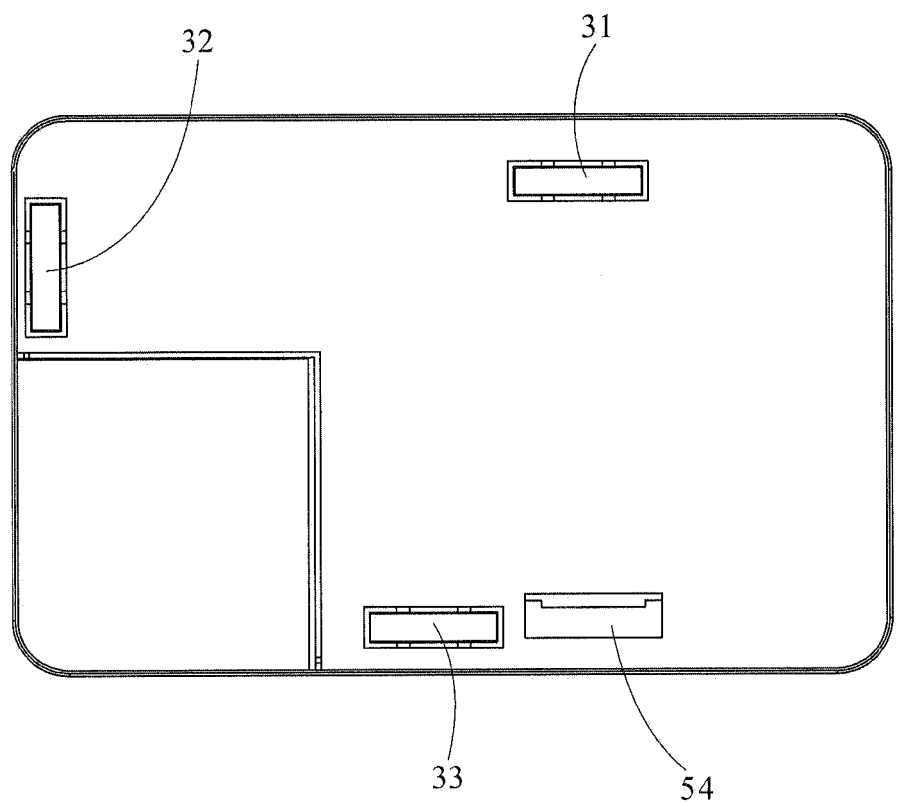
FIG. 4B is a bottom view of a power module housing of the magnetic fix structure according to the first preferred embodiment of the present invention.
Figure 5:
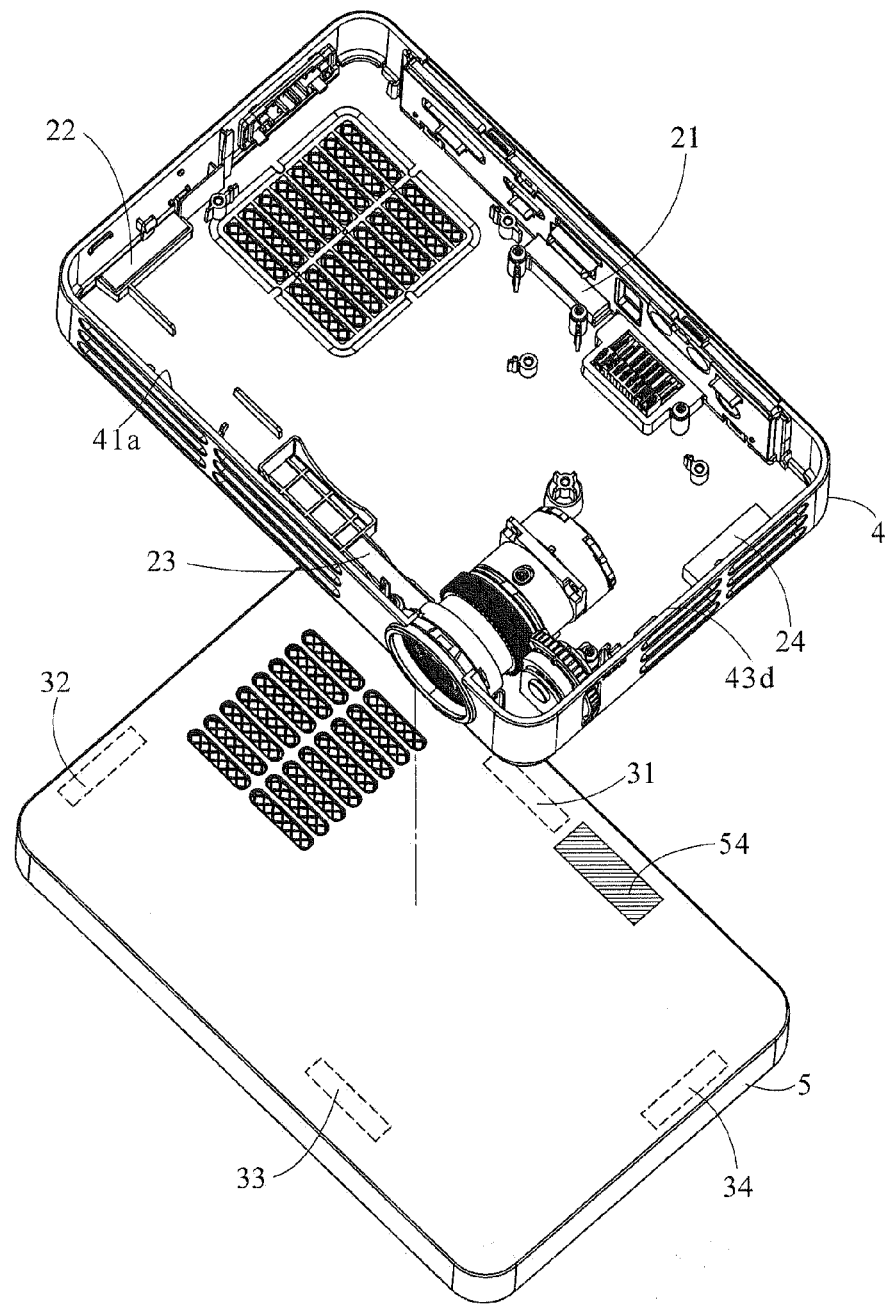
FIG. 5 is a schematic top view of a magnetic fix structure according to a second preferred embodiment of the present invention during assembling with a projection device.
Figure 6:
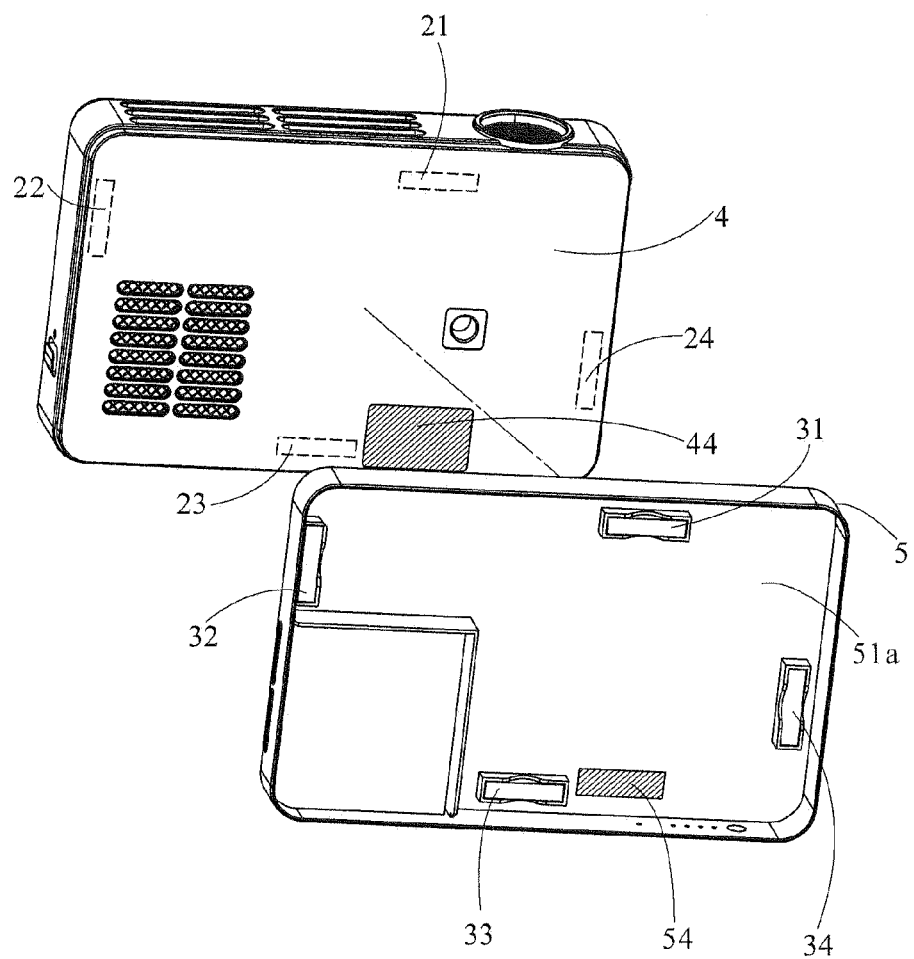
FIG. 6 is a schematic bottom view of the magnetic fix structure according to the second preferred embodiment of the present invention during assembly with a projection device.
Figure 7A:
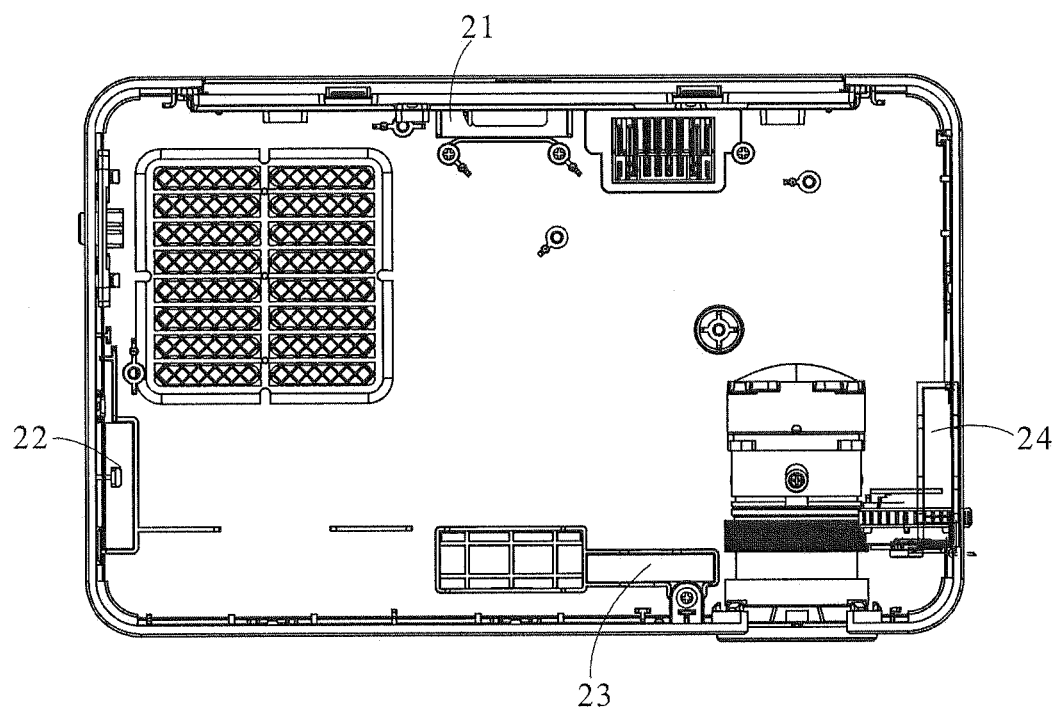
FIG. 7A is a top view of a projection module housing of the magnetic fix structure according to the second preferred embodiment of the present invention.
Figure 7B:
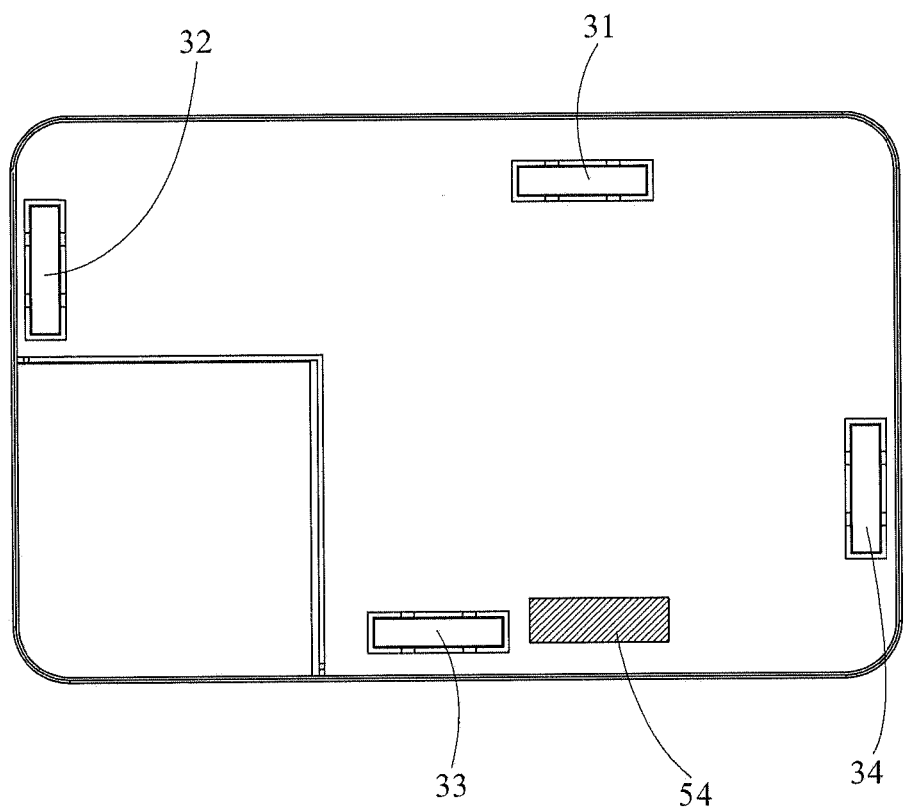
FIG. 7B is a top view of a power module housing of the magnetic fix structure according to the second preferred embodiment of the present invention.

FIGS. 2, 3, 4A and 4B illustrate schematic views of the first preferred embodiment of the magnetic fix structure of the present invention during assembly with a projection device. Specifically, FIG. 2 explicitly illustrates a top view of the internal structure of the projection module housing 4 as well as the method in which the projection module housing 4 and the power module housing 5 are assembled together. FIG. 3 explicitly illustrates the bottom view of the internal structure of the power module housing 5 as well as the method in which the projection module housing 4 and the power module housing 5 are assembled together. FIG. 4A is a schematic top view of the internal structure of the projection module housing 4, and FIG. 4B is a schematic bottom view of the internal structure of the power module housing 5.

Figure 8:
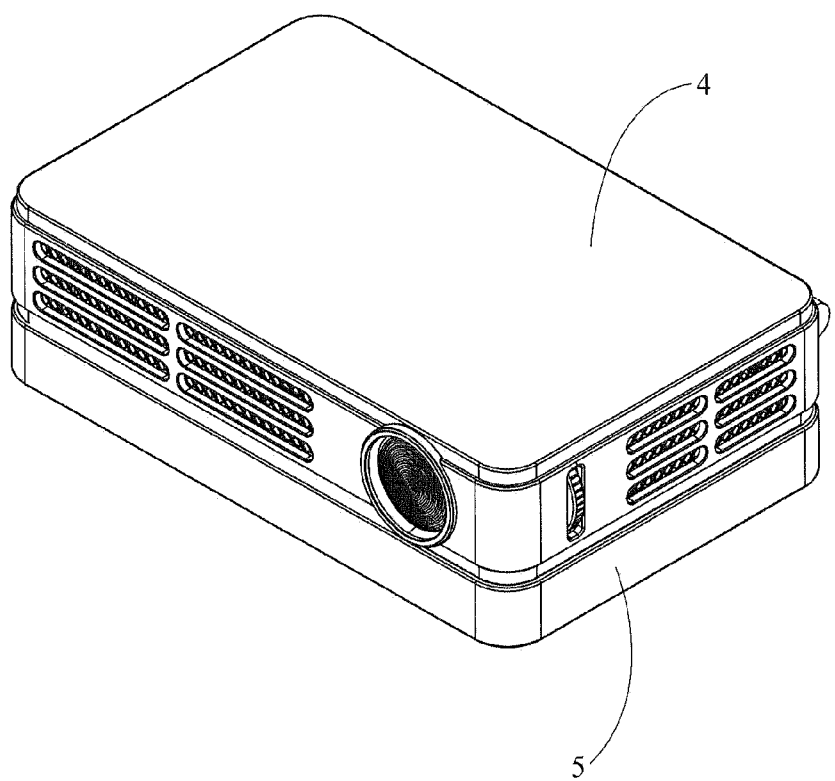
FIG. 8 is a schematic view of the projection device of the present invention.

Furthermore, the first magnetic connector set 2 has at least three magnetic units disposed on a bottom portion 41 of the projection module housing 4; and similarly the second magnetic connector set 3 also has at least three magnetic units disposed on a top portion 51 of the power module housing 5. The magnetic units in the second magnetic connector set 3 are disposed corresponding to the magnetic units of the first magnetic connector set 2 respectively. In this embodiment, the magnetic units are represented by magnets. Therefore, the magnetic units are arranged in such a way that an end of each of the magnetic units of the first magnetic connector set 2 corresponds to an end of one of the magnetic units of the second magnetic connector set 3. Furthermore, since the magnetic poles between the ends of the corresponding magnetic units are opposite each other, the first magnetic connector set 2 and the second magnetic connector set 3 can be attracted to each other as shown in FIG. 8, thereby mounting the projection module housing 4 onto the power module housing 5.

In more detail, FIGS. 2 and 4A illustrate the three magnetic units of the first magnetic connector set 2, which can be named respectively as a first magnetic unit 21, a second magnetic unit 22 and a third magnetic unit 23. These magnetic units 21, 22 and 23 are disposed on an inner bottom surface 41a of the bottom portion 41. Similarly, the three magnetic units of the second magnetic connector set 3 can be named respectively as a fifth magnetic unit 31, a sixth magnetic unit 32 and a seventh magnetic unit 33. These magnetic units 31, 32 and 33 are disposed on an inner top surface 51a of the top portion 51 and correspond to the magnetic units 21, 22 and 23 respectively.

It shall be appreciated that to clearly show the relative positional relationships between the magnetic units of the first magnetic connector set 2 and the magnetic units of the second magnetic connector set 3, the positions of the fifth magnetic unit 31, the sixth magnetic unit 32 and the seventh magnetic unit 33 in the power module housing 5 are depicted by dashed lines in FIG. 2. Likewise, the same principle is applied to the first magnetic unit 21, the second magnetic unit 22 and the third magnetic unit 23 in FIG. 3.

In other words, the magnetic units of the second magnetic connector set 3 are disposed at positions corresponding to those of the magnetic units of the first magnetic connector set 2 respectively. The end of each of the magnetic units of the first magnetic connector set 2 has a magnetic pole opposite to that of an end of a corresponding one of the magnetic units of the second magnetic connector set 3.

More explicitly, as shown in this embodiment, the first magnetic unit 21 is disposed correspondingly to the fifth magnetic unit 31; the second magnetic unit 22 is disposed correspondingly to the sixth magnetic unit 32; and the third magnetic unit 23 is disposed correspondingly to the seventh magnetic unit 33. Furthermore, if the end of each the first magnetic unit 21, the second magnetic unit 22 and the third magnetic unit 23 face the second magnetic set 3 are N poles, then the corresponding ends of the fifth magnetic unit 31, the sixth magnetic unit 32 and the seventh magnetic unit 33 facing the first magnetic set 2 would be S poles. In this way, the corresponding magnetic units would be attracted and combined with each other.

The bottom portion 41 of the projection module housing 4 has an outer bottom surface 41b, while the top portion 51 of the power module housing 5 has an outer top surface 51b. As shown in FIG. 8, the outer bottom surface 41b of the projection module housing 4 is mounted to the outer top surface 51b of the power module housing 5 when the first magnetic connector set 2 and the second magnetic connector set 3 magnetically attract each other in the aforesaid way.

In this embodiment, the projection module housing 2 of the projection device may have a first accommodating space 42 defined therein to accommodate a projection module (not shown) of the projection device. The projection module has an image forming module (not shown) and a heat dissipating module (not shown). The image forming module is an essential element for a conventional projection device, and the heat dissipating module is provided to improve the efficiency of the projection device and prevent adverse effects caused by overheating during operation. These techniques could be readily and easily appreciated by people skilled in the art, and thus will not be further described herein.

Furthermore, the power module housing 5 may further have a second accommodating space 52 defined therein. The second accommodating space 52 may include a power module (not shown), which may be a battery or a structure equivalent to a power supply.

The projection module housing 4 has a first electrical connection structure 44, while the power module housing 5 has a second electrical connection structure 54. The first electrical connection structure 44 comprises at least one protrusion, while the second electrical connection structure 54 comprises at least one recession, which has a shape corresponding to the protrusion to receive the protrusion. The first electrical connection structure 44 can be electrically connected to the second electrical connection structure 54. It shall be appreciated that since the technical features of the present invention focus on the magnetic fix structure for a projection device, some necessary components of the projection device are omitted from the drawings. Additionally, the essential elements of the projection device described in this specification such as the imaging module, the heat dissipating module or the power module are not limited to what is disclosed in the attached drawings, and other essential or equivalent elements well known to those of ordinary skill in the art shall also be included.

In this embodiment, the first magnetic unit 21, the second magnetic unit 22 and the third magnetic unit 23 are preferably respectively disposed adjacent to a first side surface 43a, a second side surface 43b and a third side surface 43c of the projection module housing 4. When the magnetic units are disposed adjacent to the aforesaid side surfaces of the projection module housing 4, the magnetic interference caused by magnetic units on electronic parts within the projection device can be reduced. When disposed correspondingly to the first magnetic unit 21, the second magnetic unit 22 and the third magnetic unit 23, the fifth magnetic unit 31, the sixth magnetic unit 32 and the seventh magnetic unit 33 are also disposed adjacent to the side surfaces of the power module housing 5 respectively.

Furthermore, as can be seen from the top view of the internal structure of the projection module housing 4 shown in FIG. 4A, the first magnetic unit 21 and the third magnetic unit 23 are disposed substantially obliquely corresponding to each other on the inner bottom surface 41a. That is, the projection module housing 4 could define two virtual axes (i.e., an axis x and an axis y) which both pass through the center of the projection module housing 4; the axes are also perpendicular to each other. When a line that passes through any two of the first magnetic unit 21, the second magnetic unit 22 and the third magnetic unit 23 is drawn, the line would not be parallel with either axis x or axis y. As can be known from this, the fifth magnetic unit 31 and the seventh magnetic unit 33 are also disposed substantially obliquely corresponding to each other on the inner top surface 51a.

Thus, in the assembly process of the projection device of this embodiment, an assembly error can be detected when the power module housing 5 is not magnetically attracted to the projection module housing 4 (i.e., when the magnetic units of the first magnetic connector set 2 are not correspondingly aligned with the magnetic units of the second magnetic connector set), thereby achieving the objectives of foolproof and alignment.

FIGS. 5, 6, 7A and 7B illustrate schematic views of a second preferred embodiment of the magnetic fix structure of the present invention during assembly with the projection device. The second preferred embodiment of the present invention is similar to the first preferred embodiment in that the magnetic fix structure also comprises the first magnetic connector set 2 and the second magnetic connector set 3. The projection device also comprises the projection module housing 4 and the power module housing 5. However, the second preferred embodiment differs from the first preferred embodiment in that in the second preferred embodiment, the first electrical connection structure 44 and the second electrical connection structure 54 are thin conductive structures. Furthermore, in the second embodiment the first magnetic connector set 2 comprises a fourth magnetic unit 24 disposed on the inner bottom surface 41a; while the second magnetic connector set 3 further comprises an eighth magnetic unit 34 disposed on the inner top surface 51a corresponding to the fourth magnetic unit 24. In other words, the fourth magnetic unit 24 and the eighth magnetic unit 34 are disposed at positions corresponding to each other on the projection module housing 4 and the power module housing 5 respectively.

In this embodiment, both the fourth magnetic unit 24 and the eighth magnetic unit 34 are magnets; an end of the fourth magnetic unit 24 faces an end of the eighth magnetic unit 34; the magnetic poles are opposites to magnetically attract each other.

Furthermore, similar to the other magnetic units of the first magnetic connector set 2, the fourth magnetic unit 24 is disposed adjacent to a fourth side surface 43d of the projection module housing 4 so that the magnetic interference on the electronic parts inside the projection device can be reduced. Preferably, as described in the first preferred embodiment, the fourth magnetic unit 24 and the eighth magnetic unit 34 are disposed substantially oblique to each other on the inner bottom surface 41a to prevent the projection module housing 4 and the power module housing 5 from being assembled in the wrong direction. Because the eighth magnetic unit 34 is disposed correspondingly to the fourth magnetic unit 24, the eighth magnetic unit 34 and the sixth magnetic unit 32 are also disposed substantially oblique to each other on the inner top surface 51a.

In this embodiment, the assembly errors can also be reduced through the arrangement of the magnetic poles of the magnetic units of the first magnetic connector set 2 with the second magnetic connector set 3. For example, if the corresponding ends of the first magnetic unit 21 and the third magnetic unit 23 facing the second magnetic connector set 3 are an N pole and an S pole respectively, the corresponding ends of the fifth magnetic unit 31 and the seventh magnetic unit 33 respectively facing the aforesaid ends, would be an S pole and an N pole to magnetically attract the first magnetic unit 21 and the third magnetic unit 23. Thus, if the first magnetic unit 21 is mistakenly aligned with the seventh magnetic unit 33 by an assembly operator, the ends would be mutually exclusive with each other so that the power module housing 5 cannot be successfully mounted on the projection module housing 4.

According to the above descriptions, the present invention provides a magnetic fix structure for a projection device. Through the attraction between opposite magnetic poles of a plurality of magnetic connector sets, the two housings or two units of the projection device can be accurately aligned and mounted to each other. Therefore, the assembly process is simplified, and the assembly errors within the projection device are reduced.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A magnetic fix structure applying on a projection device, the projection device comprising a projection module housing having an inner bottom surface and a power module housing, the magnetic fix structure comprising:

a first magnetic connector set comprising at least three magnetic units disposed on a bottom portion of the projection module housing; and a second magnetic connector set comprising at least three magnetic units disposed on a top portion of the power module housing corresponding to the at least three magnetic units of the first magnetic connector set respectively;

wherein the first magnetic connector set magnetically attracts the second magnetic connector set so as to allow the projection module housing to be fixed on the power module housing and the projection module housing defines two virtual axes, the virtual axes are perpendicular to each other and are defined a virtual surface parallel to the inner bottom surface, one of the virtual axes is perpendicular to an edge of the inner bottom surface, wherein a line that passes through any two of the three magnetic units of the first magnetic connector set is drawn, the line would not be parallel with either of the two virtual axes.

2. The magnetic fix structure as claimed in claim 1, wherein an end of each of the magnetic units of the first magnetic connector set magnetically attracts an end of one of the magnetic units of the second magnetic connector set correspondingly, and a magnetic pole of the end of the magnetic unit of the first magnetic connector set and a magnetic pole of the end of the magnetic unit of the second magnetic connector set are opposite.

3. The magnetic fix structure as claimed in claim 2, wherein the at least three magnetic units of the first magnetic connector set are a first magnetic unit, a second magnetic unit and a third magnetic unit respectively and are disposed on the inner bottom surface.

4. The magnetic fix structure as claimed in claim 3, wherein the first magnetic connector set further comprises a fourth magnetic unit, which is disposed on the inner bottom surface.

5. The magnetic fix structure as claimed in claim 4, wherein the top portion of the power module housing comprises an inner top surface, and the at least three magnetic units of the second magnetic connector set are a fifth magnetic unit, a sixth magnetic unit and a seventh magnetic unit respectively and are disposed on the inner top surface corresponding to the first magnetic unit, the second magnetic unit and the third magnetic unit so as to magnetically attract the first magnetic unit, the second magnetic unit and the third magnetic unit respectively.

6. The magnetic fix structure as claimed in claim 5, wherein the second magnetic connector set further comprises an eighth magnetic unit, which is disposed on the inner top surface corresponding to the fourth magnetic unit so as to magnetically attract the fourth magnetic unit.

7. The magnetic fix structure as claimed in claim 6, wherein the bottom portion of the projection module housing comprises an outer bottom surface, the top portion of the power module housing comprises an outer top surface, and the outer bottom surface of the projection module housing is fixed on the outer top surface of the power module housing when the first magnetic connector set and the second magnetic connector set magnetically attract each other.

8. The magnetic fix structure as claimed in claim 7, wherein the projection module housing comprises a first receiving space to receive a projection module of the projection device.

9. The magnetic fix structure as claimed in claim 8, wherein the power module housing comprises a second receiving space to receive a power module.

10. The magnetic fix structure as claimed in claim 5, wherein the first magnetic unit, the second magnetic unit and the third magnetic unit are respectively disposed adjacent to a first side surface, a second side surface and a third side surface of the projection module housing respectively.

11. The magnetic fix structure as claimed in claim 6, wherein the fourth magnetic unit is disposed adjacent to a fourth side surface of the projection module housing.

12. The magnetic fix structure as claimed in claim 10, wherein the first magnetic unit and the third magnetic unit are disposed substantially obliquely corresponding to each other on the inner bottom surface.

13. The magnetic fix structure as claimed in claim 11, wherein the second magnetic unit and the fourth magnetic unit are disposed substantially obliquely corresponding to each other on the inner bottom surface.

14. The magnetic fix structure as claimed in claim 9, wherein the projection module comprises a first electrical connection structure disposed on the outer bottom surface of the projection module housing, and the power module comprises a second electrical connection structure disposed on the outer top surface of the power module housing corresponding to the first electrical connection structure so as to electrically connect to the first electrical connection structure.

15. The magnetic fix structure as claimed in claim 14, wherein the first electrical connection structure comprises at least one protrusion.

16. The magnetic fix structure as claimed in claim 15, wherein the second electrical connection structure comprises at least one recession, which has a shape corresponding to the at least one protrusion to receive the at least one protrusion.

\* \* \* \* \*